Oct. 18, 1932.   J. A. SPENCER   1,883,250

VALVE

Original Filed June 19, 1930

John A. Spencer, INVENTOR.

BY Bonifant Hamilton

ATTORNEY.

Patented Oct. 18, 1932

1,883,250

UNITED STATES PATENT OFFICE

JOHN A. SPENCER, OF NEWTONVILLE, MASSACHUSETTS, ASSIGNOR TO THE SPENCER THERMOSTAT COMPANY, OF CAMBRIDGE, MASSACHUSETTS, A CORPORATION OF MASSACHUSETTS

VALVE

Application filed June 19, 1930, Serial No. 462,370. Renewed June 27, 1932.

The present invention relates to a temperature controlled valve of a type wherein the operation of the valve is controlled by a fluid flowing externally of the valve, the valve actuating member being in thermal contact with the external fluid, the operation of the valve controlling a flow of fluid passing through the valve casing. More specifically, the invention relates to a thermostatically controlled valve, especially adapted for use in connection with hot water installations for domestic use to prevent the overheating of the water, or, vice versa, super-cooling thereof, the thermostat being in thermal contact with the water circulating to a heater so that when the water reaches a predetermined temperature the thermostat will operate to close the valve to stop the flow of gas or other fluid fuel to the heater to extinguish the flame thereof.

In the prior art, difficulty has been encountered in supplying a compact valve structure for such purposes wherein the valve will be certain to always operate as intended, and which will not be detrimental to the general appearance of the installation. In the present instance, there is provided a valve which is compact in its construction and which will operate automatically for the control of fuel (e. g. gas) flow to the burner of the heater to shut off the burner when the temperature of the water circulating in thermal contact with the thermostat reaches the predetermined operating temperature of the thermostat; and in this connection, it will be apparent that, although the herein described application of the valve is in connection with a domestic hot water system, the invention will be readily adapted for many other uses, such as for the making and breaking of an electrical circuit, or the cutting off of a flow of liquid through the valve, or for the control of any fluid, liquid or gaseous, passing through the valve.

Figure 1:
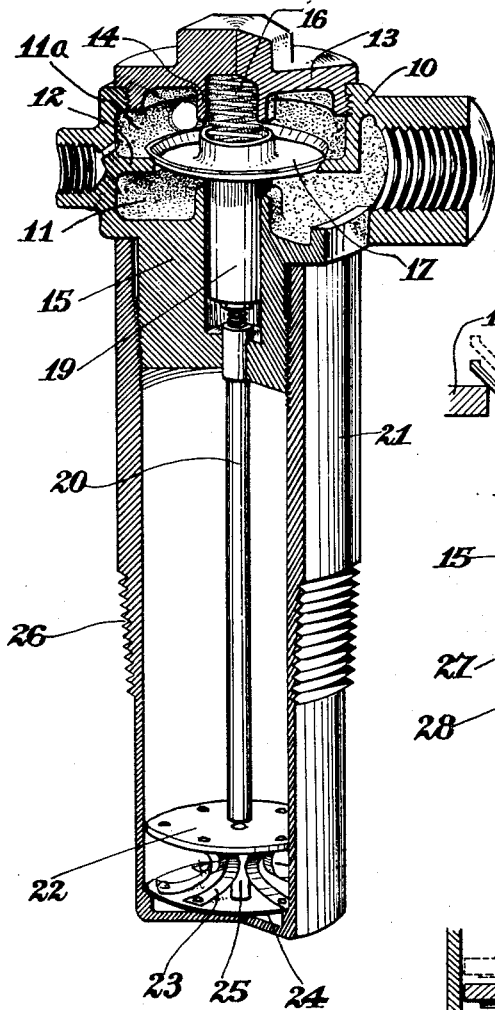
Figure 2:
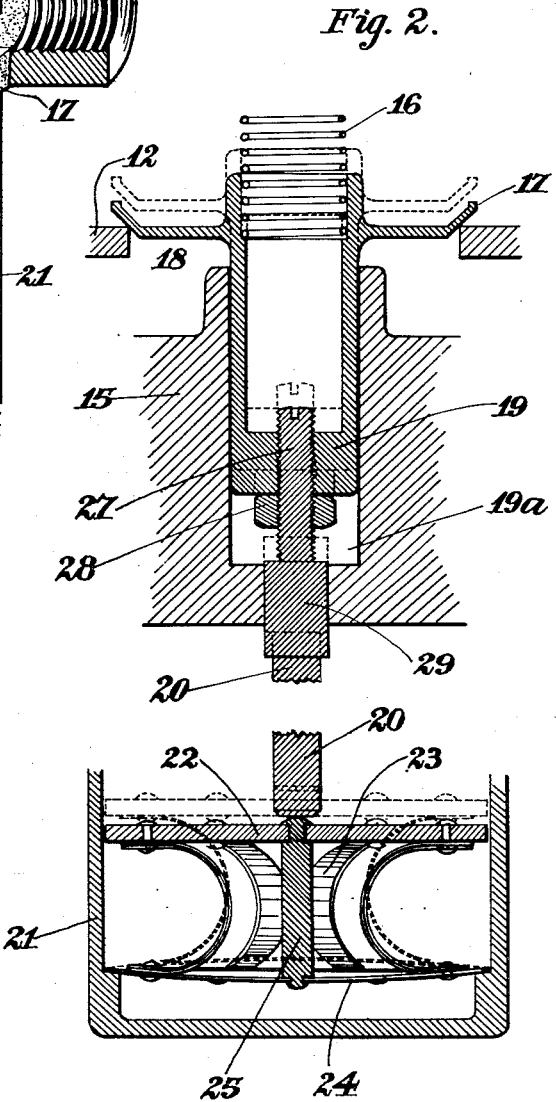

In the annexed drawing, which shows an example of a valve construction in accordance with the present invention, Figure 1 is a sectional view through the valve assembly, and Figure 2 is an enlarged detail view of the valve and actuating means.

Referring more particularly to the drawing, 10 designates a casing having therein compartments 11 and 11a defined by the partition 12, having a fluid passage port therein, the casing 10 being open at the top, which opening is closed by the cap 13 threaded therein, the cap 13 having a recessed boss 14 cast therein which forms a chamber in which a spring 16 is inserted.

A portion of the casing forms a substantially solid block 15, recessed to receive the stem 19 of the valve 17, this valve seating over the port 18 in the partition 12. The valve stem is indicated at 19, the valve 17 being shown as being integral with the stem, the stem 19 being hollow and being provided with an internal shoulder against which the spring 16 bears.

In adjustable engagement with the stem 19 is a rod 20 of a length such that it will reach to a position adjacent the bottom of the closed end of the hollow member 21 which is threaded on the portion 15 of the housing 10, the end of the rod 20 engaging a thermostatic unit placed in the closed end of the member 21. As illustrated, this thermostatic unit is formed of a relatively rigid sheet 22 and a flexible sheet 24, the sheets 22 and 24 being secured to the respective ends of the curved strips 23 formed of composite thermostatic material of different coefficients of expansion, as for example, iron and brass, the strips being so disposed that their expansion and contraction, according to the temperature variations to which they are subjected, will move the sheets 22 and 24 to in turn move the rod 20 to control the valve 17. The sheets 22 and 24 are firmly spaced apart by the rigid member 25.

As above mentioned, rod 20 is adapted to be moved by movement of the sheet 22, the rod 20 engaging either the sheet or the spacer 25 which obviously moves along with the sheets 22 and 24; and it was also said above that the rod 20 is in adjustable relation with the stem 19.

This is accomplished by inserting a screw 27 through the closed end of stem 19, the screw being secured in position by the lock nut 28, the screw 27 abutting against a cap 29 secured to the end of rod 20. This cap is desirably of a metal which is resistant to both wear and corrosion, rod 20 in practice being conveniently of aluminum, which is, as is well known, relatively soft. The force with which the rod 20 engages the thermostatic unit can be therefore adjusted by removing cap 13 and operating screw 27 by a screwdriver passed into the stem 19. This adjustment determines the amount of motion transmitted from the thermostat to the valve, the firmer the engagement between rod 20 and sheet 22, the less motion of the latter will be lost.

Member 21 may be threaded, as at 26, for securing the member into a fluid line, the temperature of the fluid circulating around the exterior of the member 21 effecting the operation of the thermostatic strips 23.

The operation of the valve is dependent upon how the expansible component of the strips is placed. If it be desired to seat the valve 17 upon its port to shut off the flow of fluid through the port when the temperature outside of the member 21 reaches a predetermined maximum, the expansible component of the strips 23 is placed on the outside of the curve of the strips, i. e., on the convex side; while, if the valve 17 is to be seated when the temperature falls to a predetermined minimum, the expansible component is placed on the concave side of the strips. In the former instance, expansion of the more expansible component will cause the strips 23 to tend to curl up, pulling sheets 22 and 24 towards each other to withdraw the sheet 22 from engagement from the rod 20, spring 16 then seating the valve 17. In the latter instance, expansion of the more expansible component will tend to straighten out the strips 23 to maintain sheet 22 in firm engagement with rod 20, while the cooling of the strips 23 will cause contraction and curling.

The more expansible component of the strips 23 is conveniently brass, and the less expansible component is conveniently the nickel alloy known as "invar metal", the coefficient of thermal expansion of which is practically zero; although, as above mentioned, strips 23 may be made of brass and iron, or any other suitable combination of materials having substantially different coefficients of thermal expansion.

It will be apparent from a consideration of this invention that the embodiment herein specifically described and illustrated is readily susceptible to many changes in the details of its construction without departing from the inventive concept; and accordingly it will be understood and desired to embrace within the scope of this invention such modifications and changes as may be necessary to adapt it to varying conditions and uses.

I claim:

1. A valve structure comprising the combination with a casing having a passage therethrough, of a valve member adapted to control the flow of fluid therethrough, a rod for operating the valve member, a substantially rigid sheet engaging the said rod, temperature responsive means for movably supporting the sheet to lift it against the stem, and a flexible sheet secured to the temperature responsive means and forming, with the said rigid sheet, means for securing the temperature responsive means in position.

2. A valve structure comprising a casing having a passage therethrough, a valve member within the casing adapted to control flow of fluid therethrough, a stem secured to the valve member, thermostatic means adapted to unseat and to seat the valve, said means comprising a substantially flat, rigid sheet movably engaging the stem, a plurality of curved resilient thermostatic strips engaging the sheet and adapted to change shape under temperature variations of predetermined range, and a concavo-convex flexible sheet secured to the strips and adapted to move simultaneously therewith to permit motion of the strips.

3. A valve structure comprising a casing having a passage therethrough, a valve member within the casing adapted to control flow of fluid therethrough and having a hollow valve stem formed thereon, an adjustable screw passing through the stem, a rod in operative engagement with the screw, a spring adapted to seat the valve member, a substantially rigid sheet in operative engagement with the rod, a flexible sheet, a rigid spacing member secured to the sheets for spacing them apart, and thermostatic members adapted to change shape under influence of temperature changes of predetermined range, the thermostatic members being positioned between the sheets, whereby said thermostatic members change shape with change in temperature and move the rigid sheet while causing flexing of the said flexible sheet, the motion of the sheets operating the valve member through corresponding movement of the said rod.

In testimony whereof, I have signed my name to this specifiaction this 12th day of June, 1930.

JOHN A. SPENCER.